United States Patent [19]

Kempter et al.

[11] Patent Number: 5,484,850
[45] Date of Patent: Jan. 16, 1996

[54] COPOLYMERS CROSSLINKABLE BY A FREE RADICAL METHOD

[75] Inventors: Fritz E. Kempter, Mannheim; Wolfgang Reich, Rodach; Ulrich Jäger, Harthausen; Eckhard Korona, Neustadt, all of Germany

[73] Assignee: BASF Aktiengesellschaft, Ludwigshafen, Germany

[21] Appl. No.: 330,678

[22] Filed: Oct. 28, 1994

[30] Foreign Application Priority Data

Nov. 3, 1993 [DE] Germany .......................... 43 37 481.6

[51] Int. Cl.$^6$ .................. C08F 269/00; C08F 265/00
[52] U.S. Cl. .................. 525/286; 525/301; 525/303
[58] Field of Search .................. 525/286, 301, 525/303

[56] References Cited

U.S. PATENT DOCUMENTS

| | | |
|---|---|---|
| 3,974,303 | 8/1976 | Iwase et al. . |
| 4,056,559 | 11/1977 | Lewis et al. . |
| 4,059,616 | 11/1977 | Lewis et al. . |
| 4,064,161 | 12/1977 | Lewis et al. . |
| 4,103,093 | 7/1978 | Lewis et al. . |
| 4,208,313 | 6/1980 | Lewis et al. . |
| 4,336,345 | 6/1982 | Lewis et al. . |
| 4,357,435 | 11/1982 | Lewis et al. . |
| 4,517,343 | 5/1985 | Schupp ..................................... 525/488 |

FOREIGN PATENT DOCUMENTS

| | | |
|---|---|---|
| 2088129 | 8/1993 | Canada . |
| 2240312 | 3/1973 | Germany . |
| 2336517 | 2/1975 | Germany . |
| 2436186 | 3/1975 | Germany . |
| 4203277A1 | 8/1993 | Germany . |
| 4203278A1 | 8/1993 | Germany . |
| WO91/09888 | 7/1991 | WIPO . |
| WO93/25596 | 12/1993 | WIPO . |

*Primary Examiner*—Vasu S. Jagannathan
*Attorney, Agent, or Firm*—Oblon, Spivak, McClelland, Maier, & Neustadt

[57] ABSTRACT

Copolymers crosslinkable by a free radical method and having a number average molecular weight of from 1500 to 6000 and a molecular weight distribution corresponding to a polydispersity of from 1 to 4.0 are obtainable by polymer-analogous reaction of A) a copolymer (A) which is composed of
  a1) from 50 to 85 mol % of a monomer (a1) containing the structural element of methacrylic acid and
  a2) from 15 to 50 mol % of another monomer (a2) undergoing free radical polymerization,
  a3) from 5 to 50 mol % of the total amount of the monomers (a1) and (a2) being monomers (a3) which carry functional groups and whose functional groups are capable of undergoing a condensation or addition reaction, and is obtainable by free radical mass or solution polymerization at from 140° to 210° C. and with an average residence time of from 2 to 90 minutes
with B) an olefinically unsaturated monomer (B) which carries a functional group which is complementary to the functional groups of the monomers (a3).

Said copolymers are used as binders for powder coatings.

9 Claims, No Drawings

COPOLYMERS CROSSLINKABLE BY A FREE RADICAL METHOD

The present invention relates to novel copolymers crosslinkable by a free radical method and having a number average molecular weight of from 1500 to 6000 and a molecular weight distribution corresponding to a polydispersity of from 1 to 4.0, obtainable by polymer-analogous reaction of A) a copolymer (A) which is composed of
   a1) from 50 to 85 mol % of a monomer (a1) containing the structural element of methacrylic acid and
   a2) from 15 to 50 mol % of another monomer (a2) undergoing free radical polymerization,
   a3) from 5 to 35 mol % of the total amount of the monomers (a1) and (a2) being monomers (a3) which carry functional groups and whose functional groups are capable of undergoing a condensation or addition reaction, and is obtainable by free radical mass or solution polymerization at from 140° to 210° C. and with an average residence time of from 2 to 90 minutes with B) a vinyl compound (B) which carries a functional group which is complementary to the functional groups of the monomers (a3).

The present invention furthermore relates to a process for the preparation of these copolymers, the use of the copolymers obtained hereby as coating materials, compositions which contain these copolymers, and coated articles which are obtainable using these copolymers.

U.S. Pat. No. 4,064,161 discloses copolymers which have a low molecular weight and a narrow molecular weight distribution and can be used as radiation-curable powder binders. According to the preparation methods described there, they are obtained by anionic polymerization of alkyl esters of methacrylic acid, a certain proportion of the alkyl groups carrying functional groups, for example glycidyl groups. In a second step, these copolymers are subjected to a polymer-analogous reaction with olefinically unsaturated monomers carrying functional groups, for example acrylic acid, to give vinyl-containing copolymers which carry olefinically unsaturated groups as functional groups.

DE-A 24 36 186 relates to UV-curable powder binders which consist of vinyl and acrylate polymers having polymerizable unsaturated bonds in the side chains. A copolymer is prepared from styrene as main monomer, ethyl acrylate and glycidyl methacrylate by free radical solution polymerization and is then subjected to a polymer-analogous reaction with acrylic acid.

The varied, partially divergent requirements which UV-curable powder binders have to meet with regard to processing properties and performance characteristics of the surface coatings produced therewith are not satisfactorily met by the polymers known to date.

The powders should remain free-flowing when they are exposed to elevated temperatures of up to about 50° C. during preparation, storage and transport. This property is also referred to as blocking resistance. On the other hand, the baking temperature at which the powders are first formed into films and immediately thereafter crosslinked by UV irradiation should be very low so that the binders can also be used for coating heat-sensitive substrates. It is known that rapid film formation in a narrow temperature interval requires a relatively low but very uniform molecular weight of the polymer. The powder binders known to date are still unsatisfactory in this respect.

It is an object of the present invention to remedy these deficiencies, especially in the case of the UV-curable powder coating binders.

We have found that this object is achieved by the copolymers defined at the outset and crosslinkable by a free radical method.

The novel copolymers are synthesized in two steps since the unsaturated groups required for radiation curing would not be stable under the conditions of the main chain polymerization. First, the monomers (a1) to (a3) are copolymerized to give a copolymer (A) which carries reactive groups via which it can be reacted in a subsequent polymer-analogous reaction to give the novel copolymer. Monomers (a1) and (a2) concomitantly used for this purpose are those (monomers (a3)) which, in addition to the olefinic double bond, carry reactive groups which are inert under the copolymerization conditions. The copolymers (A) are reacted in a second step with vinyl compounds (B) which additionally have functionalities which react with the reactive groups of the copolymer (A) with formation of chemical bonds.

The number average molecular weight $M_n$ of the novel polymers is from 1500 to 6000, in particular from 2000 to 4000.

The polydispersity $M_w/M_n$, the quotient of the number average and the weight average molecular weight of the copolymers, is a measure of the molecular weight distribution of the copolymers and is ideally 1, although values below 4.0, in particular below 3.5, are also sufficient in practice.

The stated polydispersity and number average and weight average molecular weights $M_n$ and $M_w$ are based here on measurements by gel permeation chromatography, polystyrene being used as the standard. The method is described in Analytiker Taschenbuch, Vol. 4, pages 433 to 442, Berlin 1984.

The molecular weight and the molecular weight distribution of the novel copolymers are determined by the polymerization conditions in the preparation of the copolymers (A).

The formation of copolymers (A) having a low polydispersity and low molecular weight is favored in particular if reaction temperatures of from 140° to 210° C., preferably from 150° to 180° C., particularly preferably from 150° to 170° C., and reaction times of from 2 to 90, preferably from 5 to 25, particularly preferably from 10 to 15, minutes are chosen.

If monomers or solvents with boiling points are below the reaction temperature are present, the reaction should advantageously be carried out under pressure, preferably under the autogenous pressure of the system. However, pressures higher than 30 bar are generally not required.

Such polymerization conditions can be maintained in particular in an annular thin-film reactor having a recycle means, since in this case the exothermic polymerization can be carried out under substantially isothermal conditions, owing to the advantageous ratio of heat exchange area to reaction volume.

Copolymerizations in annular thin-film reactors are described in, for example, DE-A 4 203 277 and DE-A 4 203 278. They are generally known and may be carried out, for example, in the form of a tube reactor equipped with a rotor and are available, for example, from Buss SMS GmbH Verfahrenstechnik. They are preferably equipped with an apparatus by means of which some of the product can be recycled to the reactor entrance.

Other polymerization apparatuses, for example stirred kettles, are also suitable, provided that sufficient heat removal is ensured.

The polymerization may be carried out in the absence of a solvent, but solution polymerization is generally preferable owing to the low viscosity of the resulting polymer solutions. The amount of solvents is in general from 0 to 30, preferably from 10 to 25, % by weight, based on the total amount of the monomers used.

Suitable solvents are all liquids which are inert toward the reactants, ie. for example ethers such as ethylene glycol ether and ethylene glycol ether, esters, such as butyl acetate, and ketones such as methyl amyl ketone. Regulatory solvents, such as alkali radicals, eg. toluene, xylenes and in particular cumene and m-xylene, and aliphatic alcohols, eg. isopropanol, are particularly advantageously used.

It is generally advisable to limit the conversion to 50–95, preferably 80–90, mol %, since narrower molecular weight distributions are obtained in this way. Unconverted monomers and volatile oligomers and the solvent are advantageously recycled to the polymerization after conventional separation from the polymer by distillation.

Particularly suitable polymerization initiators are compounds which form free radicals and whose decomposition temperature is from 140° to 200° C., for example di-tert-butyl peroxide and dibenzoyl peroxide.

The amount of the initiators is preferably from 0.5 to 10, particularly preferably from 1 to 5, mol % of the total amount of the monomers used.

Regarding the composition of the copolymers (A), it should be emphasized that, independently of the nature of the remaining moiety, the relatively high proportion of the monomers (a1) having the structural element

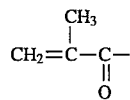

of methacrylic acid is important, and that in principal the monomer type (a1) or (a2) to which the monomers (a3) having the functional groups belong plays no role. Monomer type (a1) thus includes monomers having unreactive radicals and those of type (a3). Below, the first-mentioned monomers will be described first, followed by the monomers (a3) having the functional groups.

The monomers (a1) are primarily the $C_1$- to $C_{12}$-alkyl esters of methacrylic acid, for example ethyl methacrylate, 2-ethylhexyl methacrylate and n-butyl methacrylate and especially methyl methacrylate.

Methoxyethyl methacrylate, cyclohexyl methacrylate and benzyl methacrylate are also suitable.

Suitable monomers (a2) are in principle all monomers capable of undergoing free radical polymerization.

The alkyl esters of acrylic acid are particularly important. Examples of further suitable monomers of this type are isobutyl, n-butyl and tert-butyl acrylate.

In addition to styrene and 1-methylstyrene, for example, 4-tert-butylstyrene and 2-chlorostyrene are also particularly suitable.

Examples of further monomers (a2) capable of undergoing free radical polymerization are vinyl esters of $C_2$- to $C_{20}$-fatty acids, especially vinyl acetate and vinyl propionate, vinyl halides, such as vinyl chloride and vinylidene chloride, conjugated dienes, such as butadiene and isoprene, vinyl ethers of $C_1$- to $C_{20}$-alkanols, eg. vinyl isobutyl ether, acrylonitrile, methacrylonitrile and the $C_1$- to $C_{10}$-alkyl esters of crotonic acid and of maleic acid. Heterocyclic vinyl compounds, such as 2-vinylpyridine and N-vinylpyrrolidone, are also suitable.

The monomers (a3), which may belong to either of the classes (a1) and (a2), carry functional groups by means of which the desired functionalization of the copolymers (A) to give the novel copolymer may be effected in a condensation or addition reaction with a vinyl compound (B) carrying a complementary group. Such functional groups are, for example, hydroxyl, carboxamido, amino, carbonyl as an aldehyde or ketone function, isocyanate and especially carboxyl and epoxy.

Corresponding monomers are primarily the relatively cheap compounds 2-hydroxyethyl acrylate and methacrylate, allyl alcohol, 2-aminoethyl acrylate and methacrylate, acrolein, methacrolein and vinyl ethyl ketone, acrylamide and methacrylamide, vinyl isocyanate, methacryloyl isocyanate, dimethyl-3-isopropenylbenzyl isocyanate (TMI) and 4-isocyanatostyrene and especially acrylic acid, methacrylic acid, crotonic acid, maleic acid and anhydrides thereof, as well as glycidyl acrylate and glycidyl methacrylate. The polymers (A) are composed of from to to 85, preferably from 60 to 85, mol % of one or more of the monomers (a1) and from 15 to 50, preferably from 15 to 40, mol % of one or more of the monomers (a2).

The proportion of the total amount of the monomers (a1) and (a2) which comprises one or more of the monomers (a3) is from 5 to 50, preferably from 15 to 40, particularly preferably from 20 to 35, mol %.

At conversions of less than 100%, the desired composition of the polymer (A) will rarely correspond to the composition of the monomer mixture used, because the monomers polymerize at different rates. In such cases, it is necessary to adapt the proportion of the particular monomers in the monomer mixture according to their reaction rate. This adaptation may be effected, for example, by analyzing the composition of the unconverted monomer mixture distilled off and thus determining the composition of the copolymer (A). In principle, it will be necessary, for example, to choose a relatively high proportion of the methacrylic acid derivatives and to reduce the proportion of the other monomers.

Accordingly, the monomer mixtures usually contain from 60 to 95, preferably from 65 to 90, mol % of one or more of the monomers (a1) and from 5 to 40, preferably from 10 to 35, mol % of one or more of the monomers (a2).

The proportion of the total amount of the monomers (a1) and (a2) used which comprises one or more of the monomers (a3) is from 5 to 50, preferably from 15 to 40, particularly preferably from 20 to 35, mol %.

After their preparation, the copolymers (A) are preferably freed from the solvent and from excess monomers by distillation, and the remaining small amounts of residual monomers and volatile oligomers are removed under reduced pressure or with passage of nitrogen through the melt.

Owing to the high glass transition temperatures of the polymers and the high boiling points of some of the monomers, a continuously operated thin-film evaporator in which the copolymer is preferably devolatilized at from 180° to 220° C. above the polymerization temperature is particularly suitable for this purpose.

In order to obtain the novel polymers crosslinkable by a free radical, the polymers (A) are derivatized in a polymer-analogous reaction. They are reacted with functional olefinically unsaturated monomers (B) (referred to below as vinyl monomers (B) whose functional groups complement those of the polymer. Suitable vinyl monomers (B) of this type which carry functional groups are the same compounds as the abovementioned monomers (a3). A complementary pair whose functional groups can react with one another in a condensation or addition reaction can then be selected from the group consisting of the vinyl monomers (a3) or (B). One partner is used for synthesizing the polymer (A) in the copolymerization while the other serves as a reactant in the polymer-analogous reaction. Pairs such as methacryloyl isocyanate/hydroxyalkyl methacrylate, hydroxyalkyl methacrylate/methacrylic anhydride and hydroxyalkyl methacrylate/methacryloyl chloride are suitable here. The combination glycidyl methacrylate or glycidyl acrylate with methacrylic acid or acrylic acid is particularly preferred.

In a further possible procedure for obtaining the polymers crosslinkable by a free radical method, some of the ester groups which may be present in the copolymer (A) are hydrolyzed and the resulting carboxyl groups are then reacted with glycidyl methacrylates or glycidyl acrylates.

The polymer-analogous reaction of the polymers (A) with the complementary monomeric functional vinyl compounds (B) to give the novel vinyl-containing polymers crosslinkable by a free radical method is preferably carried out in a reaction extruder. The reaction temperatures are from 80° to 150° C., preferably from 90° to 140° C., particularly preferably from 100° to 130° C., the residence times are from 3 to 20 minutes and the conversion is 50–100%.

Suitable catalysts are all those which are usually used for accelerating the reaction between the complementary groups. For example, phosphines, such as triphenylphosphine, amines, such as dimethylbenzylamine, dimethylethanolamine and tributylamine, and tetraalkylammonium halides are suitable for the pair of reactants epoxide/carboxylic acid, and, for example, organotin compounds are suitable for the pair of reactants isocyanate/alcohol.

The ratio of functional groups of the polymer (A) to the functional vinyl monomers (B) is preferably from 0.7:1 to 1.3:1, in particular from 0.8:1 to 1.2:1, very particularly preferably 1:1.

An excess of functional groups in the polymer (A) may serve to transform the properties of the crosslinked polymer, for example to ensure that it acquires an electrostatic charge less readily. Such free groups are in particular carboxyl, hydroxyl and carboxamido.

The monomers (B) which are used in excess or have not reacted are usually removed in an extruder by devolatilization.

In order to avoid premature thermal crosslinking, it may be advisable to add from 1 to 5000 ppm, preferably from 1 to 1000 ppm, of an inhibitor to the polymers (A) before the polymer-analogous reaction. Examples of suitable inhibitors are phenylthiazines, sterically hindered o-phenols or halfethers of hydroquinone.

The copolymers are commercially suitable even in this form. They are generally converted into a ready-to-use composition by dissolution or dispersing.

The emulsions or solutions are preferably those having a high solids content, preferably at least 50, particularly preferably at least 60, very particularly preferably at least 70, % by weight, based on the solution or emulsion, of polymer.

In line with the main application as binders for powder coating, however, the novel copolymers, if desired together with additives, such as pigments, crosslinking catalysts, stabilizers, dulling agents and levelling agents, are preferably dried in a conventional manner to give powders having a mean particle diameter of from 10 to 100 μm.

The crosslinking catalysts used are the conventional photoinitiators, such as benzoin ethers, benzophenones, benzoinphosphine oxides and thioxanthones.

The powders obtained from the novel copolymers have the generally desired, relatively low film formation temperature, which however is substantially above the maximum storage temperature. If the copolymers are formulated to have a higher or lower film formation temperature, the maximum storage temperature is also higher or lower.

Owing to the narrow molecular weight distribution, the temperature interval in which the novel polymer powders crosslinkable by a free radical method are transformed into a free-flowing state with good thermal formation properties is particularly narrow. Consequently, the difference between maximum storage temperature and minimum film formation temperature (processing temperature) can be kept particularly small. Compared with prior art systems, this has the advantage that either the processing temperature can be further reduced without having to accept a lower maximum storage temperature or, conversely, the maximum storage temperature of the powders can be further increased without increasing the minimum film formation temperatures, ie. the processing temperatures.

In practice, film formation and UV radiation are carried out by conventional methods known to a person skilled in the art, at from 70° to 150° C., depending on the field of use, but in most cases at from 90° to 130° C. Polymers whose glass transition ranges $T_G$ are close to the desired processing temperature are chosen for this purpose.

The maximum storage temperatures which must be adhered to in the case of the particular polymer powders are as a rule from 40° to 50° C.

The novel polymers can be cured by self-crosslinking or by the presence of a co-crosslinking agent. Examples of co-crosslinking agents are compounds which are prepared by condensation of methacrylic or acrylic acid with hydroxyalkylated triaminotriazines. The adducts of triglycidyl isocyanurate with acrylic acid are also preferred co-crosslinking agents.

The novel polymers are used as coating materials for any substrates, such as metal, wood, particle boards or plastics. The compounds are particularly suitable as an unpigmented topcoat in the coating of automotive bodywork.

EXAMPLES

A. Preparation of Copolymers (A)

Example 1a

A mixture of 750 g of glycidyl methacrylate, 330 g of styrene, 486 g of methyl acrylate, 1434 g of methyl methacrylate and 58.3 g of di-tert-butyl peroxide was added continuously to 600 g of isopropanol in a 5 l reactor in the course of 1 hour. Thereafter, a solution of 4 g of di-tert-butyl peroxide in 150 g of isopropanol was added and polymerization was carried out for a further 15 minutes, after which the polymerization was stopped by cooling to room temperature. The polymer solution was diluted to one and a half times the amount with xylene, filtered and freed from volatile components in a thin-film evaporator at 210° C. and 1 mbar.

1254 g of a copolymer (A/1) which had a glass transition temperature $T_G$ of 42° C., a softening point of 84° C., a number average molecular weight of 1800, a polydispersity of 2.1 and an epoxide content of 1.54 epoxide milliequivalents per g (cf. Ullmanns Encyclopädie der technischen Chemie, volume 8, 3rd edition of 1957, page 436) were obtained. The solids content was 99.2% and was determined by drying a sample of the copolymer for 20 minutes at 200° C.

Example 2a

A mixture of 600 g of isopropanol, 750 g of glycidyl methacrylate, 320 g of hydroxyethyl acrylate, 390 g of styrene, 1440 g of methyl methacrylate and 55,5 g of di-tert-butyl peroxide was copolymerized and worked up, these steps being carried out as described in Example 1.

The resulting copolymer (A/2) had a glass transition temperature $T_G$ of 42° C., a softening point of 85° C., a number average molecular weight of 1500, a polydispersity of 2.3 and an epoxide content of 1.44 epoxide milliequivalents per g. The solids content was 98.7%.

B. Polymer-analogous Reaction

Example 1b

In a twin-screw extruder (type ZSK from Werner and Pfleiderer) having screws rotating in the same direction and possessing a nominal diameter of 30 mm and a length/diameter ratio of 33:1, 2065 g/hour of a mixture consisting of 96.8% by weight of the milled copolymer (A/1), 1.1% by weight of 2,4,6-trimethylbenzoyldiphenylphosphine and 2.1% by weight of triphenylphosphine were reacted with 180 g of acrylic acid, which had been stabilized with 100 ppm of phenothiazine, at 130° C. in an average residence time of 7 minutes.

The resulting copolymer crosslinkable by a free radical method had a glass transition temperature $T_G$ of 36° C., a softening point of 71° C., a number average molecular weight of 1900, a polydispersity of 2.5, an epoxide content of 0.14 epoxide milliequivalents per g, an acid number of 3.8 and an iodine number of 24.

Example 2b

This experiment differed from Example 1 in that 2065 g/hour of a mixture consisting of 96.8% by weight of the milled copolymer (A/2), 1.1% by weight of 2,4,6-trimethylbenzoyldiphenylphosphine and 2.1% by weight of triphenylphosphine were subjected to a polymer-analogous reaction with 190 g of acrylic acid.

The resulting copolymer crosslinkable by a free radical method had a glass transition temperature $T_G$ of 17° C., a softening point of 66° C., a number average molecular weight of 1400, a polydispersity of 2.0, an epoxide content of 0.19 epoxide milliequivalents per g, an acid number of 3.5 and an iodine number of 21.

Production of the Powder Coatings

A sieve fraction, having a particle diameter of less than 100 μm, of a milled copolymer crosslinkable by a free radical method was applied to phosphated steel sheets, heated for 10 minutes (said copolymer prepared according to Example 1b) or 15 minutes (said copolymer prepared according to Example 2b) at 120° C. in a through-circulation oven and, after this time, exposed twice to a 120 watt UV lamp from IST. A 50 μm thick acetone-resistant coating was obtained.

We claim:

1. A copolymer crosslinkable by a free radical method and having a number average molecular weight of from 1500 to 6000 and a molecular weight distribution corresponding to a polydispersity of from 1 to 4.0, prepared by reaction of:

A) a copolymer (A) which is composed of
  a1) from 50 to 85 mol % of a monomer (a1) containing the methacryloyl group;
  a2) from 15 to 50 mol % of another monomer (a2) capable of undergoing free-radical polymerization; and
  a3) from 5 to 50 mol % of the total amount of the monomers (a1) and (a2) being monomers (a3) which carry functional groups selected from the group consisting of hydroxyl, carboxyamido, amino, carbonyl, isocyanate, carboxyl and epoxy, said functional groups being capable of undergoing a condensation or addition reaction, said polymer obtained by free radical mass or solution polymerization at a temperature from 140° to 210° C. and with an average residence time of from 2 to 90 minutes with B) an olefinically unsaturated monomer (B) which carries a functional group which is complementary to the functional groups of monomers (a3).

2. A copolymer as claimed in claim 1, wherein said copolymer (A) is prepared by thin-film polymerization.

3. A copolymer as claimed in claim 1, comprising
  from 60 to 70 mol % of the monomers (a1)
  from 15 to 25 mol % of the monomers (a2)
  from 15 to 25 mol % of the monomers (a3).

4. The crosslinkable copolymer of claim 1, wherein said polydispersity ranges from 1 to 3.5.

5. The copolymer of claim 1, wherein said monomer (a1) is a $C_{1-12}$ alkyl ester of methacrylic acid, methoxyethyl methacrylate, cyclohexyl methacrylate, or benzyl methacrylate.

6. The copolymer of claim 1, wherein said monomer (a2) is a vinyl ester of a $C_{2-20}$ fatty acid, a vinyl halide, a conjugated diene, a vinyl ether of a $C_{1-20}$ alkanol, acrylonitrile, methacrylonitrile, a $C_{1-10}$ alkyl ester of crotonic acid or maleic acid, 2-vinylpyridine or N-vinylpyrrolidone.

7. The copolymer of claim 1, wherein said monomer (a3) is a 2-hydroxyethyl (meth)acrylate, allyl alcohol, 2-aminoethyl (meth)acrylate, (meth)acrolein, vinyl ethyl ketone, (meth)acrylamide, vinyl isocyanate, methacryloyl isocyanate, dimethyl-3-isopropenylbenzyl isocyanate, 4-isocyanatostyrene, (meth)acrylic acid, crotonic acid, maleic acid, maleic anhydride or glycidyl (meth)acrylate.

8. A composition suitable for powder coating, containing a copolymer as claimed in claim 1 as a UV-crosslinkable binder.

9. A coated article obtained by using a copolymer as claimed in claim 1 as a binder.

\* \* \* \* \*